United States Patent [19]

Dziemba

[11] Patent Number: 4,886,329

[45] Date of Patent: Dec. 12, 1989

[54] OPTICAL SCANNING DEVICE AS WELL AS A MICROFILM READER-PRINTER WITH SUCH A DEVICE

[75] Inventor: Peter Dziemba, Bad Nauheim, Fed. Rep. of Germany

[73] Assignee: MAP Mikrofilm Apparatebau, Dr. Poehler GmbH & Co. KG, Ober-Morlen, Fed. Rep. of Germany

[21] Appl. No.: 109,534

[22] Filed: Oct. 19, 1987

Related U.S. Application Data

[63] Continuation-in-part of Ser. No. 91,164, Aug. 31, 1987, abandoned.

[30] Foreign Application Priority Data

Sep. 1, 1986 [DE] Fed. Rep. of Germany ....... 3629725

[51] Int. Cl.$^4$ .................. G02B 26/00; G03B 27/16
[52] U.S. Cl. .................... 350/6.5; 350/360; 350/607; 355/45; 355/52
[58] Field of Search ............ 350/6.5, 607, 360; 355/45, 52

[56] References Cited

U.S. PATENT DOCUMENTS

| | | | |
|---|---|---|---|
| 3,700,325 | 10/1972 | Harper | 355/47 |
| 4,213,690 | 7/1980 | Sugiura et al. | 355/52 |
| 4,248,495 | 2/1981 | Minoura | 355/52 |
| 4,251,125 | 2/1981 | Minoura et al. | 350/6.5 |
| 4,293,184 | 10/1981 | Minoura et al. | 355/52 |
| 4,299,480 | 11/1981 | Gilkeson et al. | 355/45 |
| 4,408,874 | 10/1983 | Zinky et al. | 355/52 |
| 4,450,458 | 5/1984 | Araghi et al. | 350/360 |
| 4,655,560 | 4/1987 | Glomb, Jr. | 350/607 |
| 4,773,748 | 9/1988 | Shih et al. | 350/607 |

FOREIGN PATENT DOCUMENTS

| | | |
|---|---|---|
| 2446736 | 4/1975 | Fed. Rep. of Germany . |
| 2817525 | 7/1979 | Fed. Rep. of Germany . |
| 2915512 | 10/1980 | Fed. Rep. of Germany . |
| 3131227 | 2/1983 | Fed. Rep. of Germany . |
| 0034118 | 2/1987 | Japan .................. 350/607 |

OTHER PUBLICATIONS

MAP product brochure.
E. R. Brooke, Scanning System for a Photocopier, in Xerox Disclosure Journal, vol. 4, No. 1, Jan./Feb. 1979.

*Primary Examiner*—Bruce Y. Arnold
*Assistant Examiner*—Terry S. Callaghan
*Attorney, Agent, or Firm*—Wegner & Bretschneider

[57] ABSTRACT

In a microfilm reader-printer working according to the rotational principle one of the fixed deflecting mirrors (11, 12) by which the image is to be projected on an exposure area (13) is made and arranged in a flexible manner. A deflecting device (14) formed by a magnet coil (15) and a pusher rod (16) is continually bending one of the deflecting mirrors (11, 12) during the exposure of the base material in such a way that an image is produced that is free from distortions.

10 Claims, 2 Drawing Sheets

OPTICAL SCANNING DEVICE AS WELL AS A MICROFILM READER-PRINTER WITH SUCH A DEVICE

This application is a continuation-in-part of U.S. Ser. No. 091,164, filed Aug. 31, 1987, now abandoned.

BACKGROUND OF THE INVENTION

The invention relates to an optical scanning device with a first deflecting mirror arranged behind a lens and being controllably pivotable as well as at least one further, fixed deflecting mirror arranged in the light path of the first deflecting mirror to project on an exposure area parts of an image that change according to the pivoting motion of the first deflecting mirror. The invention also relates to a microfilm reader-printer with such a device.

By optical scanning devices an image is projected with a lens on a plane exposure area in order to expose for example the base material for the printing of an image. In the case of microfilm reader-printers two scanning principles have proved particularly successful. According to the so-called translational principle a first deflecting mirror moves in a straight-lined manner in the light path of the lens and thus projects an image that moves accordingly in a straiight-lined manner. The base material that is to be exposed has to move in a straight-lined manner according to the advance of the projected image in order to produce a complete and sharp image. The disadvantage of this translational principle that is also generally used for copying machines in offices is that the machine has to be relatively large because of the advance of the base material. This is a particular disadvantage in the case of microfilm reader-printers.

For this rason one often uses the so-called rotational principle for microfilm reader-printers. According to this principle a deflecting mirror pivots evenly in the light path of the lens and thus projects in succession the image that is to be scanned on one and the same area so that the base material that is to be exposed only has to move in that area. As a result the machines that work according to this principle are much smaller than the ones mentioned before. However, the prints they produce are not so exact as concerns the geometry of the images because the distances from the scanned image area via the deflecting mirrors to the exposure area with the base material to be exposed are always the same whereas usual lenses are optically corected so that they project a complete image on a plane area in a geometrically faultless manner in spite of different distances.

The so-called rotational principle thus causes a barrel-shaped distortion that means the width of the image is correct in the middle but at the top and at the bottom the width is reduced because of the curving mistake. But different lenses (often exchangeable up to three) in practice often show different individual distortions so that the distortions of the image have to be individually corrected according to the lens used.

SUMMARY OF THE INVENTION

The object of the invention is to develop an optical scanning device working according to the rotational principle as mentioned before in such a way that with the least possible effort and even if there are different lenses an image is produced on the exposure area that is as sharp as possible and has as little distortions as possible. Furthermore a microfilm reader-printer working according to the rotational principle is to be developed by which prints can be produced that are as far as possible free from distortions.

The first object is reached by having the further deflecting mirror made and arranged in a flexible manner and by its having a flexing means that is controllable in dependence of the pivoting motion of the first deflecting mirror and the lens-data.

By this arrangement a scanning device working according to the rotational principle achieves the same high quality of the image as devices that work according to the translational principle. Since the flexing means that is needed does not make the scanning device any bigger or heavier the advantages of a scanning device working according to the rotational principle are fully maintained, i.e. small size and little weight. Thus it is possible to build microfilm reader-printers that produce prints which are as sharp and without distortions as those produced by machines that work according to the translational principle but that are considerably compacter, lighter and cheaper in production.

The flexing means is of particularly simple construction if it is a magnet coil with a pusher rod that is adjacent against the further deflecting mirror and that is movable against the deflecting mirror if the magnet coil is activated. A further advantage of such a flexing means is the fact that the flexing it produces are proportional to the current flow in the magnet coil so that the amount of flex is easily controllable. In the case of a scanning device that works with different lenses one can for example store the special data of the lenses for the control of the flexing means in a processing unit so that the flexing means automatically continues to work correctly if a lens is changed.

Another simple embodiment of a flexing means is reached by its being an eccentric cam that is driven by a motor and that is adjacent against the further deflecting mirror.

The second object of the invention, i.e., the development of a microfilm reader-printer working according to the rotational principle, is achieved by the fact that one of the deflecting mirrors is made and arranged in a flexible manner and has a flexing means that is controllable in dependence of the pivoting motion of the first deflecting mirror. Such a microfilm reader-printer has the advantage that it produces prints that are sharp and without distortions but the machine needs not be as large and heavy as one working according to the translational principle.

The flexing means is of particlarly simple construction if it is a magnet coil with a pusher rod that is adjacent against one of the deflecting mirrors and that is moving against the deflecting mirror if there is current. Instead of a magnet coil the flexing means can also be an eccentric cam that is driven by a motor and is adjacent against one of the deflecting mirrors.

DESCRIPTION OF THE INVENTION

Figure 1:
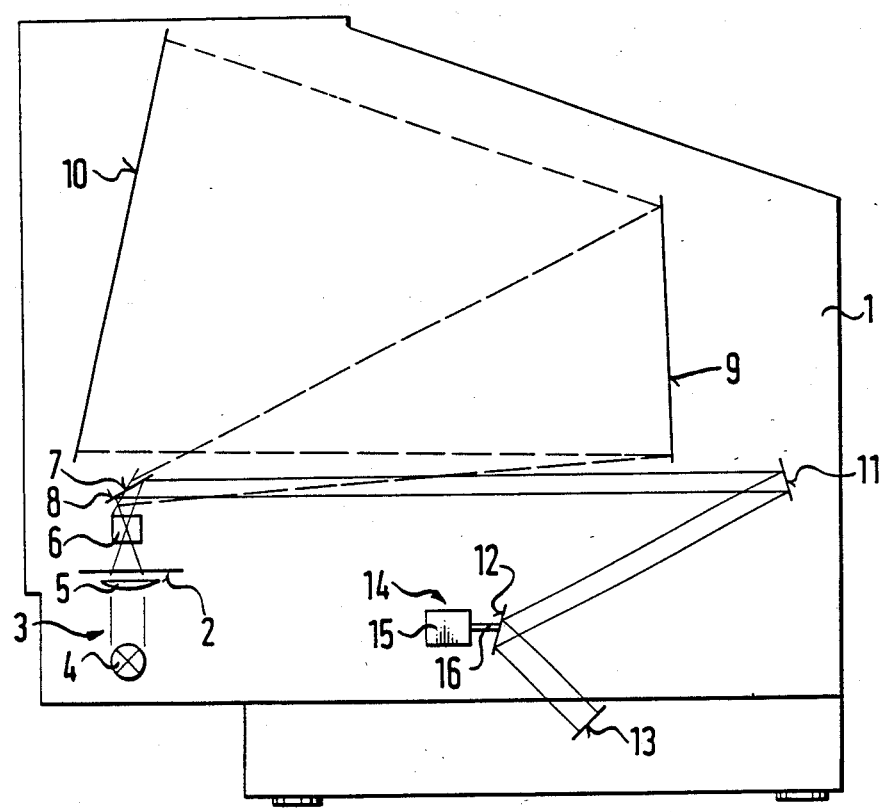
FIG. 1 schematically shows a microfilm reader-printer of the invention.
Figure 2:
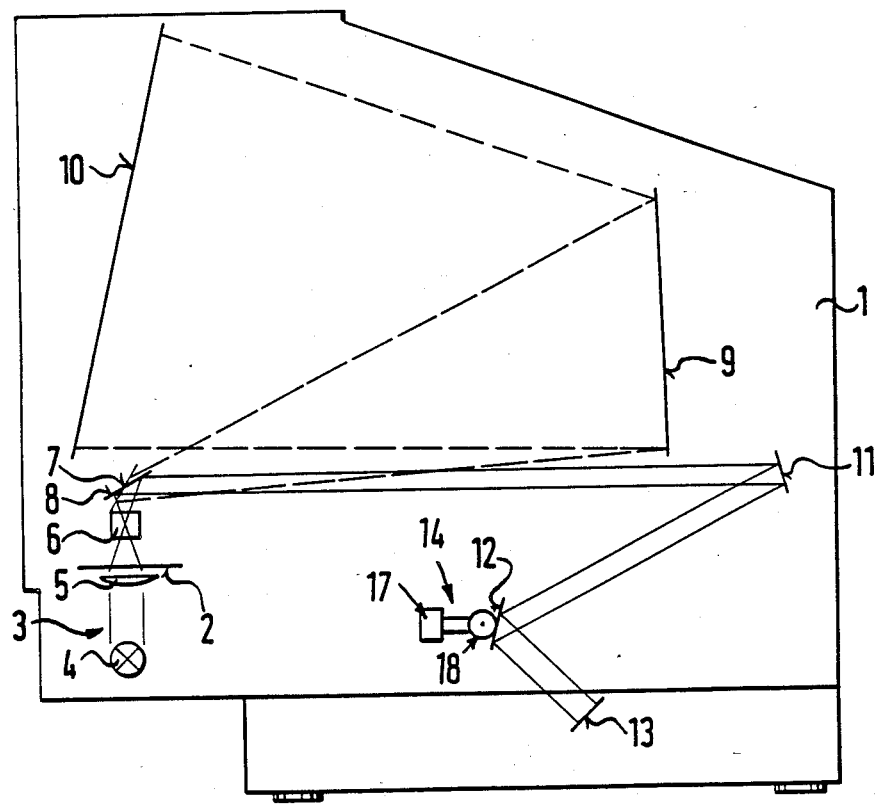
FIG. 2 schematically shows another embodiment of a microfilm reader-printer of the invention.

The microfilm reader-printer as shown in the drawing has in a casing 1 a film carrier 2 on which a transparent image carrier not shown in the drawing is to be placed for projection. Below the film carrier 2 there is a lighting unit 3 which has the usual cold light lamp 4 and condensor 5.

Above the film carrier 2 there is a lens 6 above which there is a first deflecting mirror 8 that is pivotable about an axis 7. If the machine is used as a reader the first deflecting mirror 8 reflects the light emerging from the lens 6 against a large mirror 9 in the back part of the casing 1. This mirror 9 reflects the light against a screen 10 so that one can look at the microfilm image that is visible on this screen.

If the machine is used to make a print the rotatable deflecting mirror 8 must turn clockwise. The image on the film moving from one side to the other is first projected on a second deflecting mirror 11, then on a third deflecting mirror 12 and finally on an exposure area 13. On this exposure area 13 the base material that is not shown must move according to the rotary motion of the deflecting mirror 8 and thus according to the advance of the projected image.

Important for the invention is a flexing means 14 which in this embodiment consists of a magnet coil 15 and a pusher rod 16 that is adjacent against the third deflecting mirror 12. If the magnet coil 15 is activated the pusher rod 16 is pushing harder against the deflecting mirror 12 and bends it according to its pushing force about a more or less vertical axis. Thus the deflecting mirror 12 is bending in its longitudinal direction which is possible with rather little force. It must be mentioned that one only needs a little bending in order to achieve the desired correction of the distortion of the image. Since the ending is only necessary during the short moment of the exposure of the base material the deflecting mirror 12 is only stressed a litle and due to its elasticity it completely bends back as soon as the pushing force of the pusher rod 16 stops. Therefore the deflecting mirror 12 can also be made of glass which in the case of a longer stressing would tend to deform permanently, but which in the case of a short stressing is like an ideal spring.

Finally one must point out that instad of at the third deflecting mirror 12 the flexing means 14 can be provided at the second deflecting mirror 11 or even at the first rotatable deflecting mirror 8. The construction according to the last possibility, however, would be rather expensive.

What is claimed is:

1. An optical scanning device, comprising: a controllably pivotable first deflecting mirror disposed behind a lens; a second flexible deflecting mirror disposed to direct images to an exposure area, the first mirror directing images to said second mirror, the image directed by said second mirror changing with the pivoting motion of the first mirror; and a flexing means for causing flexing of said second mirror, controllable in dependence of the pivoting motion of the first mirror and the characteristics of the lens, wherein the flexing means comprises a magnet coil and a pusher rod, the pusher rod being located adjacent the second mirror and being movable against the second mirror upon activation of the magnet coil.

2. An optical scanning device in accordance with claim 1, further comprising a third deflecting mirror for either directing images to the second mirror from the first mirror or directing images to the exposure area from the second mirror.

3. An optical scanning device in accordance with claim 1, wherein only a portion of the total image from the first mirror is directed by the second mirror.

4. An optical scanning device, comprising: a controllably pivotable first deflecting mirror disposed behind a lens; a second flexible deflecting mirror disposed to direct images to an exposure area, the first mirror directing images to said second mirror, the image directed by said second mirror changing with the pivoting motion of the first mirror; and a flexing means for causing flexing of said second mirror, controllable in dependence on the pivoting motion of the first mirror and the characteristics of the lens, wherein the flexing means comprises an eccentric cam adjacent the second mirror and a motor for driving the cam.

5. An optical scanning device in accordance with claim 4, further comprising a third deflecting mirror for either directing images to the second mirror from the first mirror or directing images to the exposure area from the second mirror.

6. An optical scanning device in accordance with claim 4, wherein only a portion of the total image from the first mirror is directed by the second mirror.

7. A microfilm reader-printer, comprising:
a lens for accepting images from microfilm;
a first controllably pivotable deflecting mirror arranged above the lens for deflecting images passing through the lens;
a second fixed deflecting mirror, the first mirror directing images to said second mirror;
a third fixed deflecting mirror, the second mirror directing images to said third mirror;
a projection area comprising an exposure slot, the third mirror directing images to said exposure slot;
at least one of said second and third mirrors being flexible; and
a flexing means for flexing the flexible mirror, controllable in accordance with the pivoting motion of the first mirror, wherein the flexing means comprises a magnet coil and a pusher rod, the pusher rod being adjacent the flexible mirror and moved against the flexible mirror when current passes through the magnet coil.

8. A microfilm reader-printer according to claim 7 wherein only a portion of the total image from the first mirror is directed by the second mirror.

9. A microfilm reader-printer, comprising:
a lens for accepting images from microfilm;
a first controllably pivotable deflecting mirror arranged above the lens for delecting images passing through the lens;
a second fixed deflecting mirror, the first mirror directing images to said second mirror;
a third fixed deflecting mirror, the second mirror directing images to said third mirror;
a projection area comprising an exposure slot, the third mirror directing images to said exposure slot;
at least one of said second and third mirrors being flexible; and
a flexing means for flexing the flexible mirror, controllable in accordance with the pivoting motion of the first mirror, wherein the flexing means comprises an eccentric cam adjacent to the flexible mirror and a motor for driving the cam.

10. A microfilm reader-printer according to claim 9, wherein only a portion of the total image from the first mirror is directed by the second mirror.

* * * * *